United States Patent
Bhattacharjya et al.

[19]

[11] Patent Number: 5,963,714
[45] Date of Patent: Oct. 5, 1999

[54] MULTICOLOR AND MIXED-MODE HALFTONING

[75] Inventors: Anoop K. Bhattacharjya, Sunnyvale; Hakan Ancin, Cupertino; Joseph S. Shu, San Jose, all of Calif.

[73] Assignee: Seiko Epson Corporation, Tokyo, Japan

[21] Appl. No.: 08/887,529

[22] Filed: Jul. 3, 1997

Related U.S. Application Data

[60] Provisional application No. 60/030,844, Nov. 15, 1996, and provisional application No. 60/035,446, Jan. 30, 1997.

[51] Int. Cl.$^6$ .............................. H04N 1/405; H04N 1/50; G06K 15/00
[52] U.S. Cl. .......................... 395/109; 382/237; 358/533; 358/534; 358/454; 358/456
[58] Field of Search ............................ 395/109; 382/237, 382/270, 275, 255; 358/533, 534, 535, 536, 454, 456, 457, 458, 468, 465, 298, 463

[56] References Cited

U.S. PATENT DOCUMENTS

| | | | |
|---|---|---|---|
| 5,014,333 | 5/1991 | Miller et al. | 382/252 |
| 5,031,050 | 7/1991 | Chan | 358/298 |
| 5,226,096 | 7/1993 | Fan | 382/237 |
| 5,287,195 | 2/1994 | Blumer | 358/298 |
| 5,394,252 | 2/1995 | Holladay et al. | 358/533 |
| 5,455,600 | 10/1995 | Friedman et al. | 345/153 |

Primary Examiner—Scott Rogers
Attorney, Agent, or Firm—Mark P. Watson

[57] ABSTRACT

A printer driver operates a printer capable of multiple dot-placement geometries or resolutions and multiple inks per color channel. It maps a continuous-tone cyan pixel-component value to continuous-tone light- and dark-cyan values, which it separately halftones to respective binary pixel values that respectively indicate whether an associated pixel will receive light- and dark-cyan ink dots. It similarly generates binary values that respectively indicate whether an associated pixel will receive light- and dark-magenta ink dots. In performing the halftoning, the driver separately performs error diffusion through different interleaved sub-images of the image to be printed so that the error-diffusion process is performed for images whose pixel geometry is that for which the process was designed even though the overall image's pixel geometry is not. The result is a modular, scaleable architecture, in which designs for one ink per channel and/or one dot-placement geometry can be adapted with minimal design effort to multiple inks and dot-placement geometries.

34 Claims, 7 Drawing Sheets

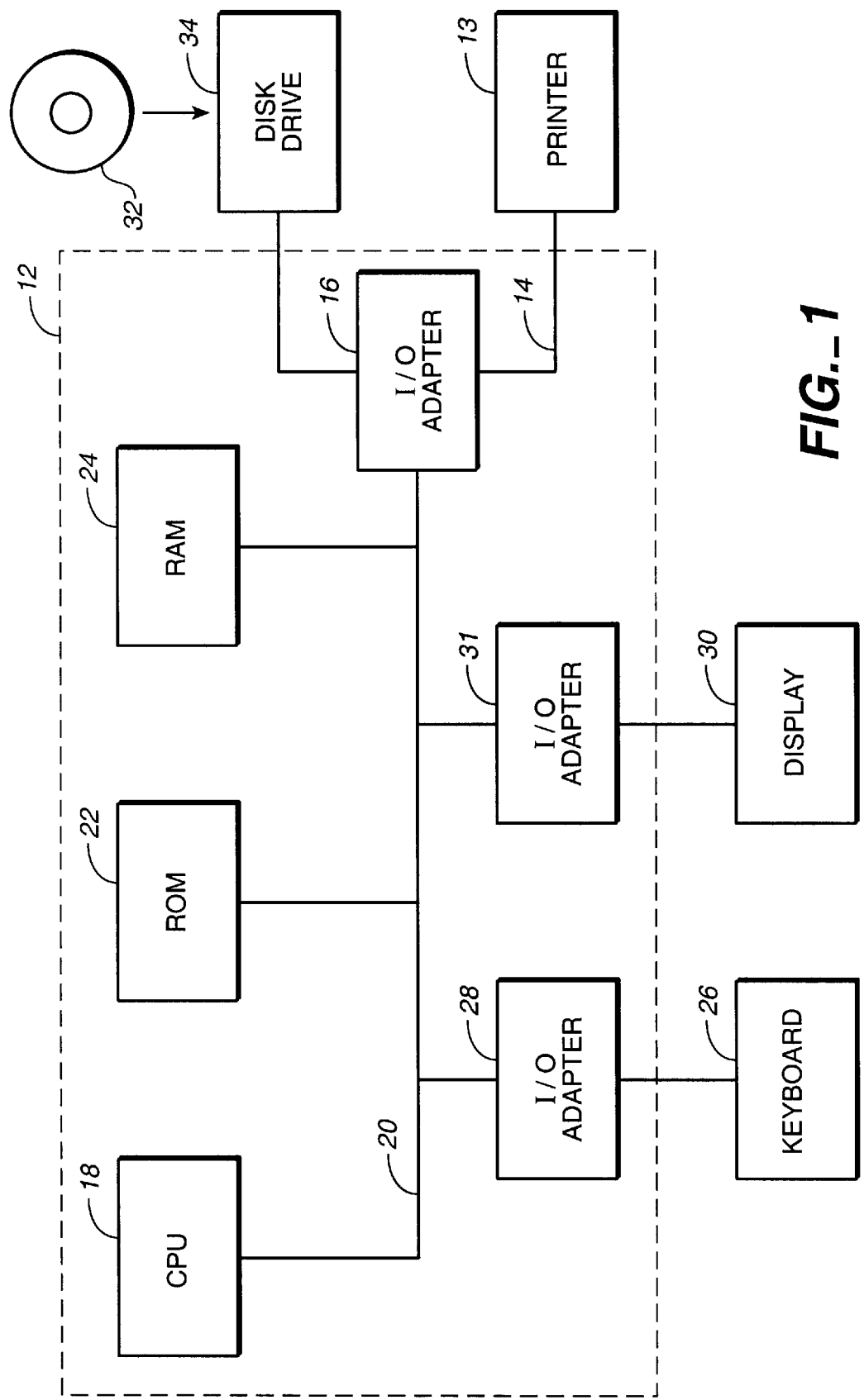
FIG._1

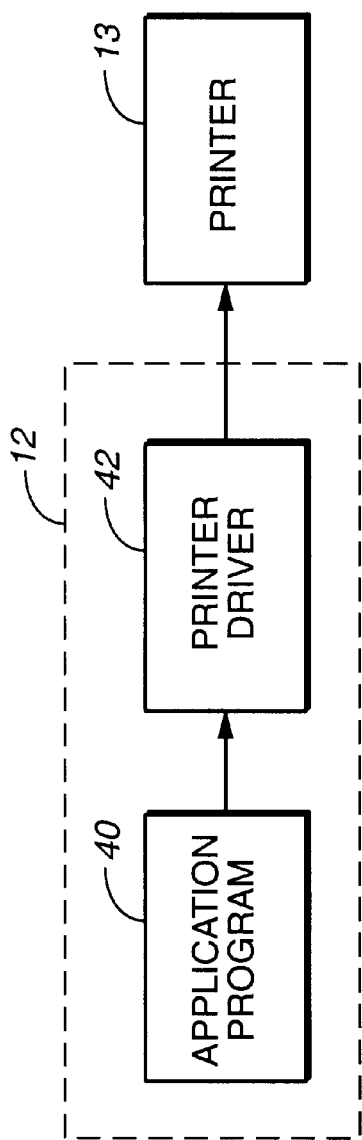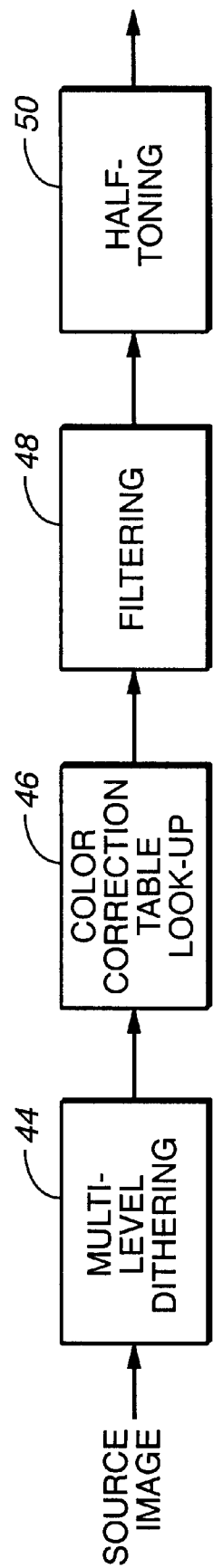

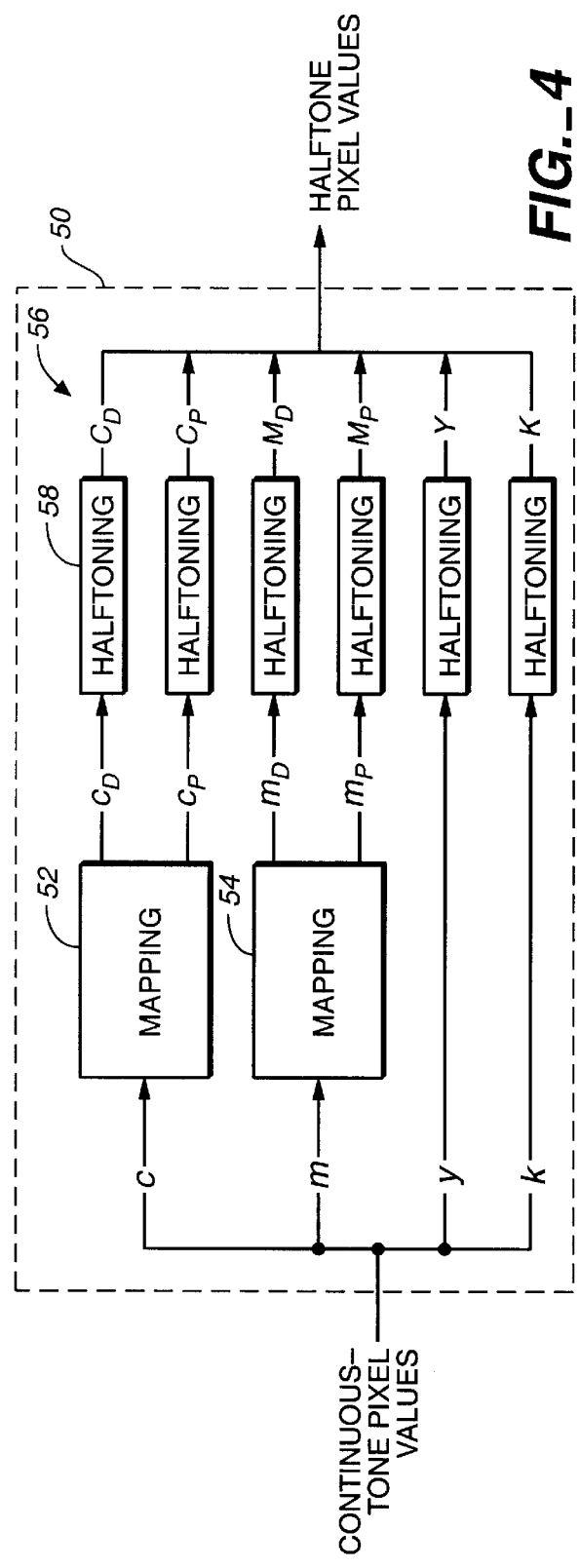
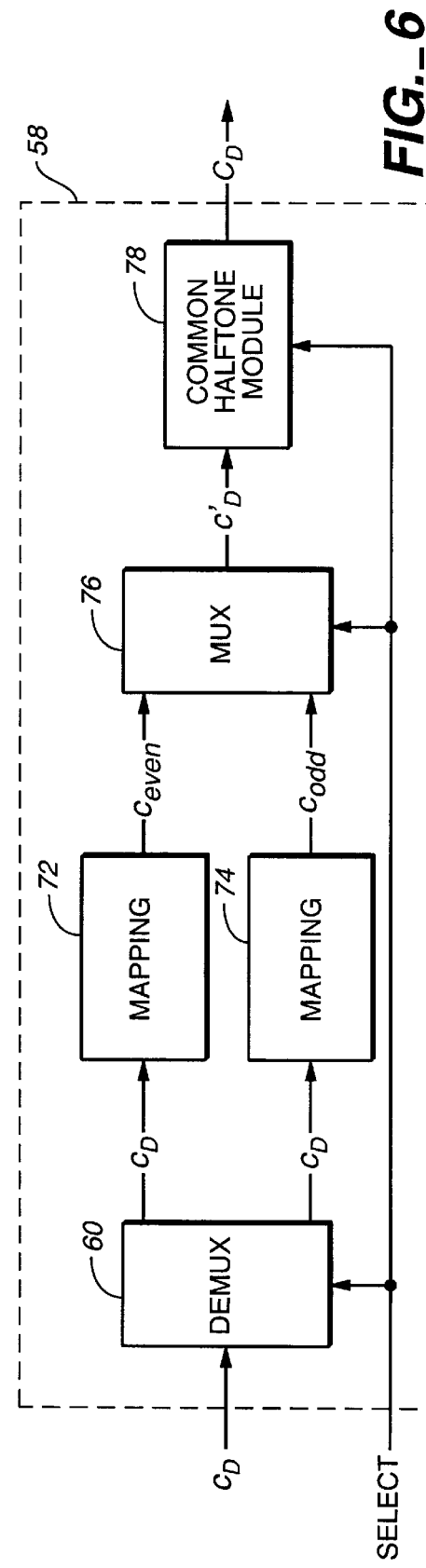

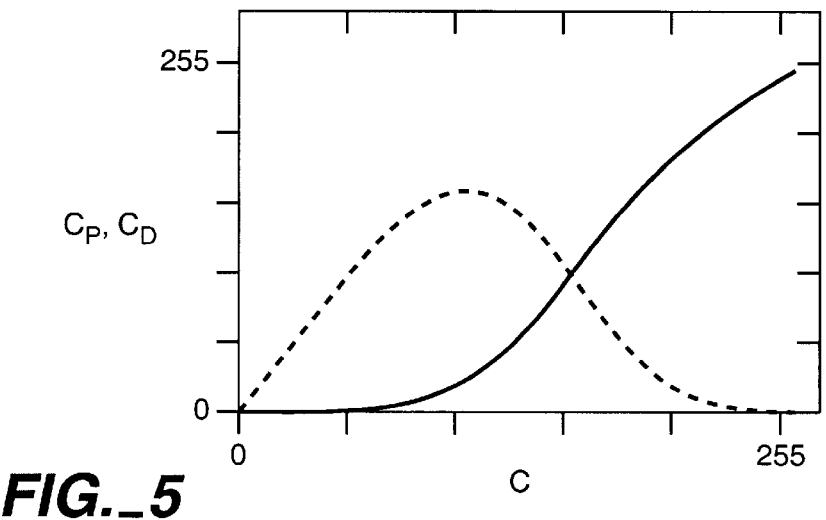
FIG._5
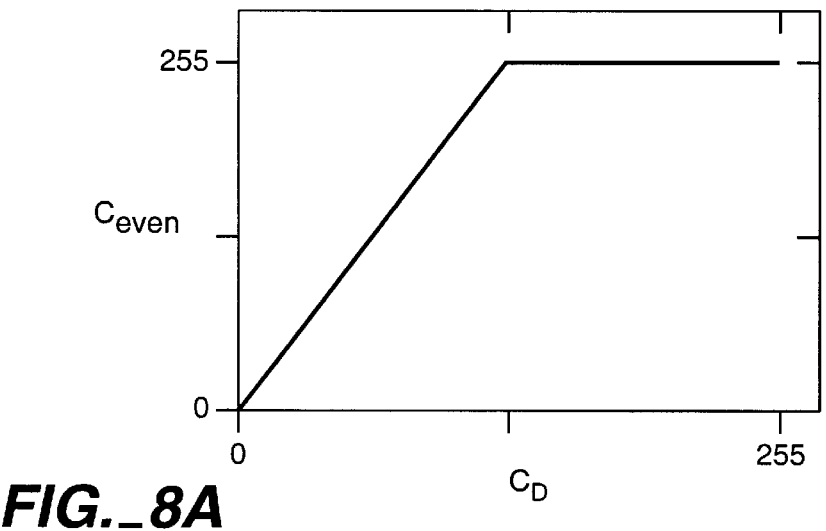
FIG._8A
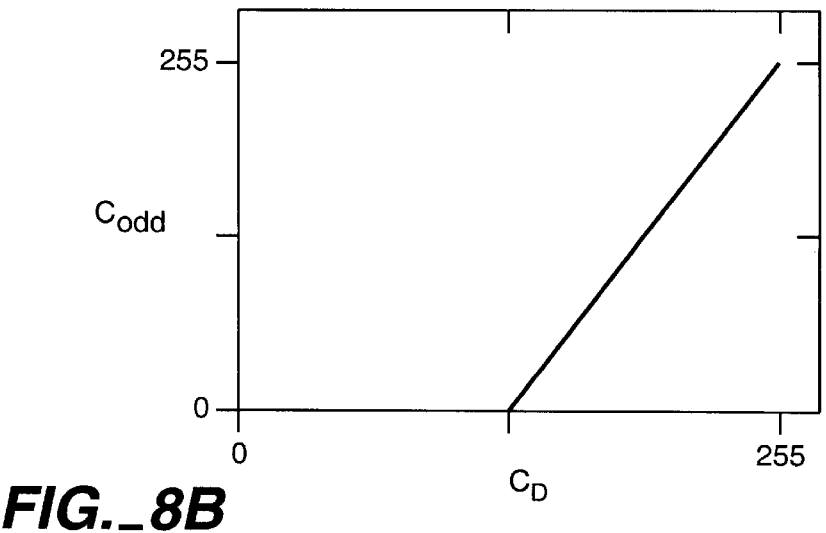
FIG._8B

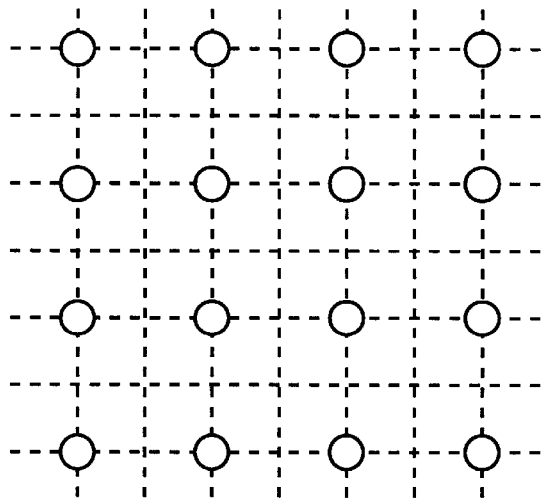
FIG._7A
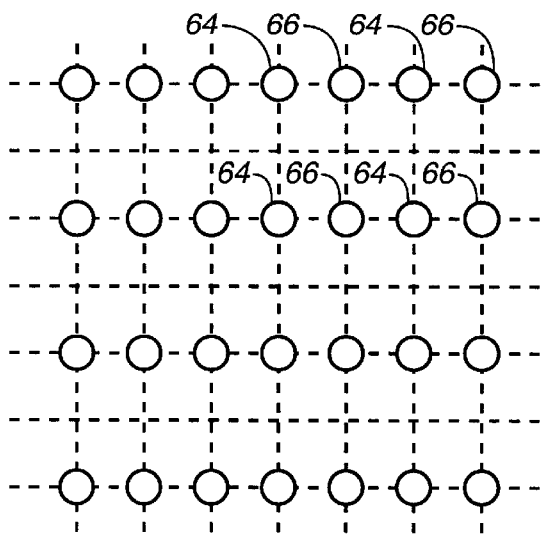
FIG._7B
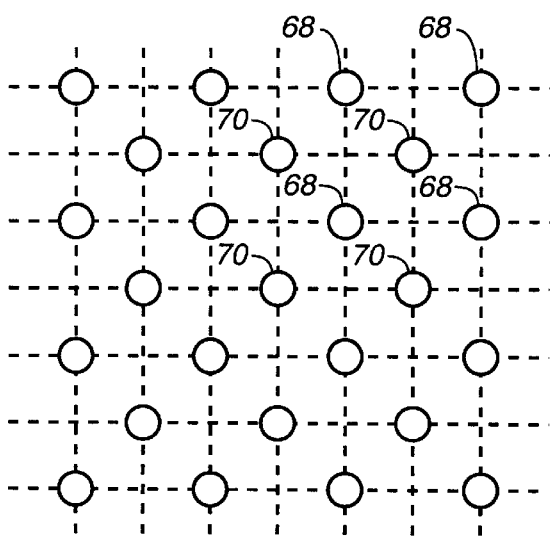
FIG._7C

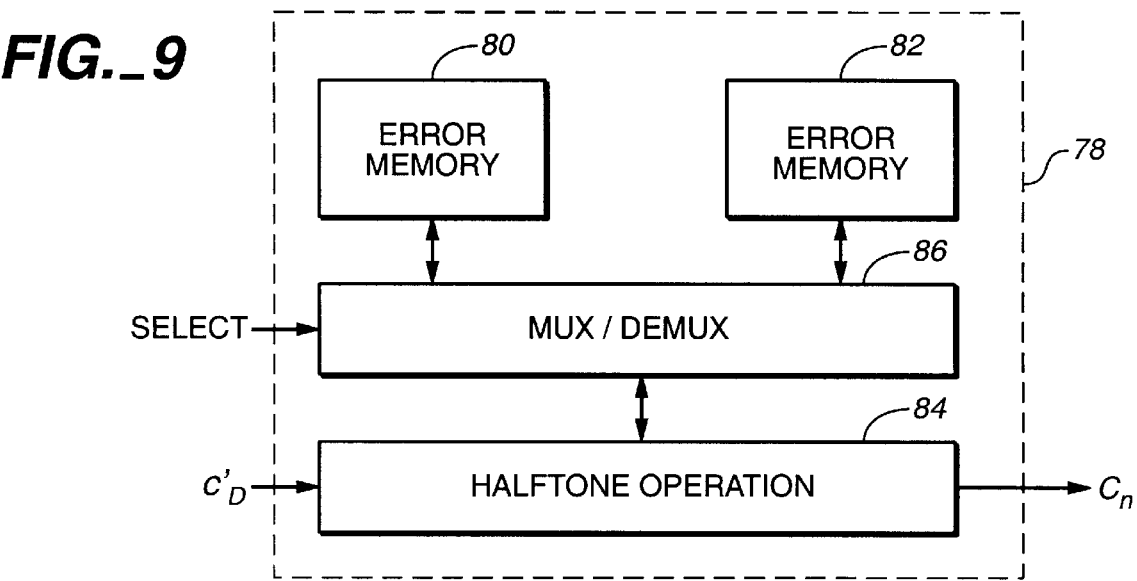
FIG._9
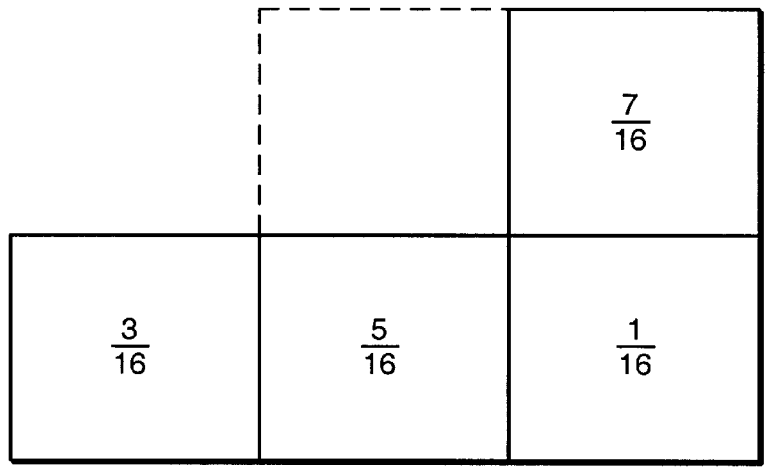
FIG._10
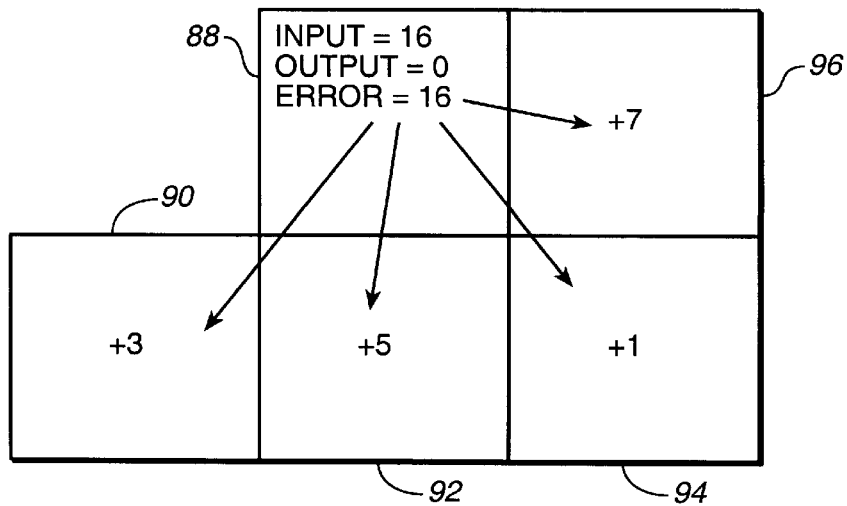
FIG._11

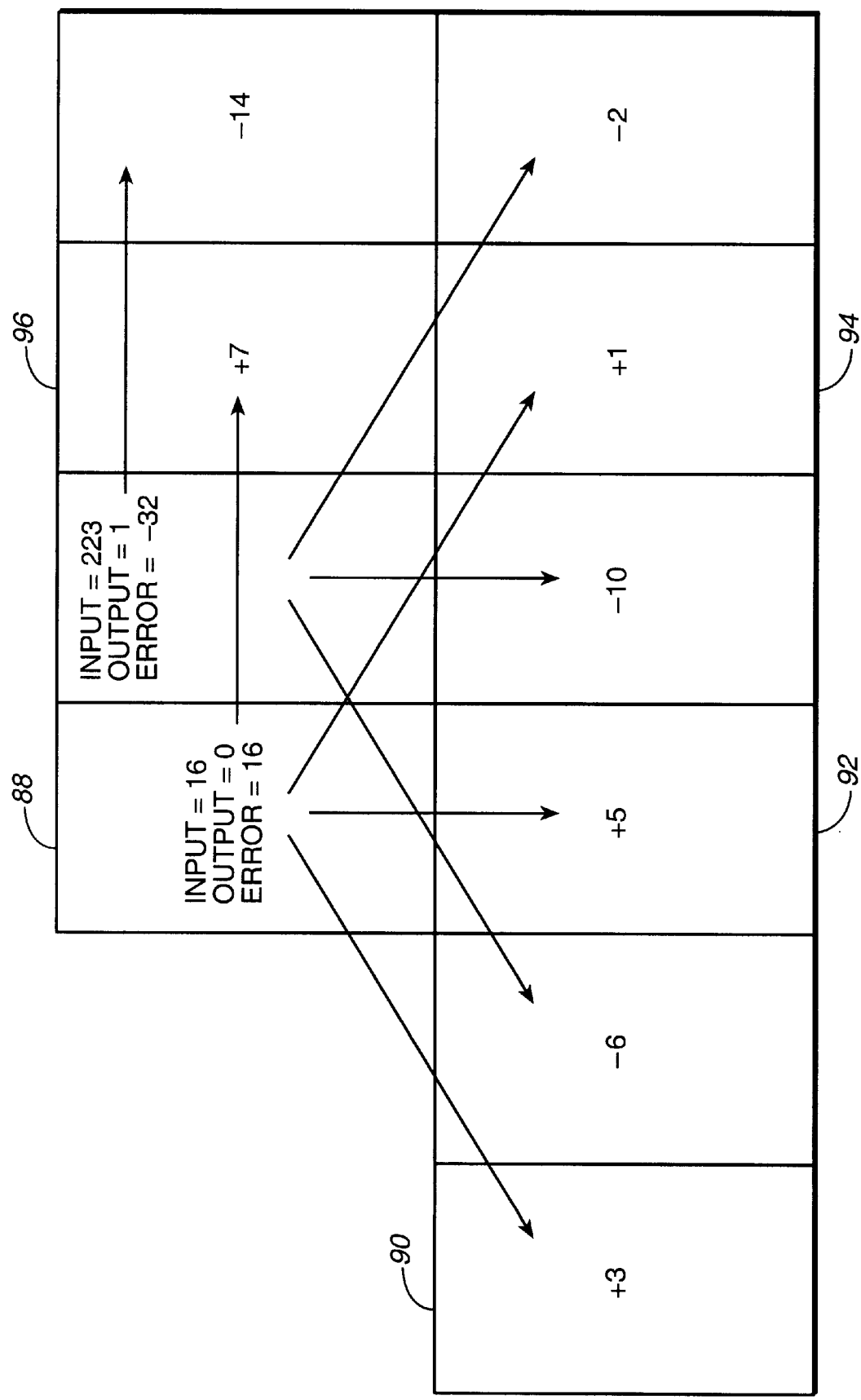
FIG._12

MULTICOLOR AND MIXED-MODE HALFTONING

This Application claims the benefit under 35 U.S.C. §119(e) of U.S. Provisional Patent Applications Ser. Nos. 60/030,844, filed Nov. 15, 1996, by Bhattacharjya et al. for 4-Color (CMYK) and Generalized Halftoning, and 60/035,446, filed Jan. 30, 1997, by Shu et al. for Image Processing, which are hereby incorporated by reference.

BACKGROUND OF THE INVENTION

The present invention is directed to image processing and particularly to methods and apparatus for halftoning.

Image data are typically taken and stored in formats that are not well suited to use by image-presentation devices such as printers. A digitally stored or processed gray-scale image typically consists of a fine-value-quantization—say, 8-bit—scalar pixel value associated with each a large number of picture elements ("pixels") of which the image consists. Digital color images are similar, with the exception that the pixel value is a vector rather than a scalar, and a similarly fine-quantization quantity represents each of the vector's color components. The color image can be thought of as consisting of a plurality of image components, each of which is a "gray-scale" image represented by a different component of every vector pixel value. So much of the following discussion's reference to gray scales is equally applicable to values of individual image components.

Consider the case of an 8-bit-per pixel digital image. A pixel can have any gray value between 0, for completely white, and 255 (=$2^8$-1), for completely black. Actually, the meaning in the stored image is often just the reverse—i.e., zero represents total black and 255 represents completely white. But when the imaging-presenting mechanism is one like a printer, in which an increase in the applied amount of the imaging agent, i.e., ink, results in a reduction in image brightness, the image data are usually converted to complementary values during the image-presentation process. The discussion that follows will be presented in terms of such "complementary" values—i.e., a higher value will mean a darker image—but the principles apply equally to positive-color presentation such as that which occurs in a cathode-ray tube, in which the image medium (the screen) is dark until it is acted on by the imaging medium (an electron beam).

With so many possible gray values, such images arc often referred to as "continuous-tone" images, even though the possible values differ from each other by finite non-zero amounts. In contrast, the typical printer can render any single pixel only completely white or completely black: the continuous-tone values at any given pixel are only 0 and 255. Some printers are capable of somewhat finer value quantization, but the quantizations of which even those are capable are almost always coarser than that of the original image.

Now, if the continuous-tone image has a uniform pixel value throughout a region, an illusion of the intended gray value can be achieved in the printed image by alternating black and white pixels throughout that uniform-value region in a ratio that corresponds to the intended gray level. Of course, most images of interest have regions whose pixel values are not uniform, but techniques of achieving the same effect in such varying regions have been developed. Such techniques are referred to as digital halftoning.

The general principles of digital halftoning are well known. One, relatively fast way to perform halftoning is known as "ordered dither." This involves comparing pixel values with respective threshold values of a "dither matrix." To make the description more concrete, let us assume that the dither-matrix size is 128×128 and that the printer output is binary, i.e., only completely white or completely black at any single pixel. The image to be halftoned is divided into corresponding-size subregions, i.e., each subregion of the area to be printed is 128 pixel widths wide and 128 pixel heights high. A dithering process involves conceptually laying a copy of the dither matrix over each such subregion so that each pixel is associated with a respective dither threshold. If the image value at a given pixel exceeds that pixel's dither threshold, then the pixel is printed completely black: it receives an ink dot. Otherwise, it is printed completely white: it receives no ink. So the dither-operation output for each pixel is a binary indication of whether that pixel will receive an ink dot. For printers that are capable of multi-level operation, the process is somewhat different: the choice is between the two quantization levels whose continuous-tone equivalents are closest to the input continuous-tone value, and the threshold is compared with the difference between the continuous-tone value and lower of those continuous-tone equivalents.

Another general approach is referred to as "error diffusion." This approach, too, also involves a threshold comparison. But ordered dither requires that the dither-matrix values be distributed evenly throughout the continuous-tone range so that the number of pixels where the continuous-tone value exceeds the corresponding dither threshold in a uniform-value region is roughly proportional to that uniform value. The error-diffusion approach can—but does not necessarily have to—use only a single threshold, because the value with which the threshold is compared is a combination of the continuous-tone value for that pixel and various percentages of the quantization errors that have resulted from halftoning at various neighbor pixels. If the continuous-tone range is from zero to 255, then a pixel that receives a dot is actually printed at a value of 255, so there is an error of −12 at that pixel if the continuous-tone input was 243. This error is divided in accordance with an error-diffusion "kernel" among the pixel's neighbors that have not yet been half-toned, and the thresholds at those pixels are compared with those pixels' values adjusted by the errors that their neighbors thus contribute.

Although these methods are simple in principle, so applying them as to achieve a high-quality result requires considerable effort. The various threshold values in a dither matrix, for instance, must be distributed very evenly about the matrix if disturbing visual effects are to be suppressed as well as possible, and achieving such an even distribution in a dither matrix large enough to provide the desired apparent value quantization at the same time is not at all trivial Even when the desired even distribution is achieved, light and midtone regions tend to be afflicted with visual effects having the periodicity with which the dither matrix "tiles" the image.

The error-diffusion approach is less subject to such periodic effects, but it tends to introduce its own, "worming" effects, particularly in light regions. Moreover, the degree to which such effects can occur in any particular type of printer depends greatly on the particular error-diffusion kernel employed.

Given the demand for printer-generated images of increasingly high quality, printers' mechanical and electrical characteristics have been developed rapidly in recent years, and new printer designs have accordingly occurred at a rapid pace. This presents the need, for each one, to find the combination of halftone techniques and parameters that will fit each new printer well enough to meet the exacting image-quality demands imposed on it. As the required quality has increased, so has the amount of experimentation and design effort that this task requires.

Moreover, the design burden is affected not only by quality-requirement increases is but also by increases in the versatility that some new printers need. To provide finer value quantization, for instance, some printers can employ cartridges that provide inks of more than one darkness for a color component. Such a cartridge may afford the capability of depositing not only ordinary, dark cyan and magenta but also lighter, "photo" cyan and magenta, and doing so typically involves multi-level halftoning. But such a printer must also be able to use one-ink-per-color-component cartridges, so it must also be capable of performing binary halftoning for cyan and magenta. This choice therefore multiplies the halftoning-strategy design effort.

But it is not the only complication. Another is pixel-geometry choice. Printer technology has advanced to the point where the number of pixels into which a small space on the print medium is divided often significantly exceeds a given job's required spatial resolution, and the computation required to process so many pixels can slow the printing process undesirably. To avoid such unnecessary processing, some printers provide a print-quality selection, which permits the user to choose among different spatial-resolution settings, and this can affect pixel geometry. If each pixel in one column is aligned horizontally with a corresponding pixel in an adjacent column and the distance between adjacent pixel rows is the twice the distance between adjacent pixel columns, the pixel geometry is rectangular with an aspect ratio of two. When the user chooses a coarser resolution, the printer may take alternate pixel columns out of service, in which case the pixel geometry becomes square. Or the printer may adopt a checkerboard geometry by removing even-numbered pixels from even-numbered rows and odd-numbered pixels from odd-numbered rows. But a halftoning strategy that works well for the rectangular geometry may not be well suited to be square geometry, and a strategy that works well for the checkerboard geometry may not work well on either of the other two.

All of these factors combine to slow the design process and complicate printer-driver software.

SUMMARY OF THE INVENTION

We have discovered a way of greatly reducing the difficulty of adjusting the half toning process to accommodate changes in operational parameters. The general approach is to adopt a halftoning strategy that works well with a given set of operational parameters and then map the input in such a way as to tend to match the baseline parameter set.

For example, we employ a basic halftone process that is tuned for, say, a square pixel geometry and then divide a different-geometry image into sub-images whose geometries are square. A simple-to-implement mapping function can be used to preserve the intended color rendition through the partitioning, and little change needs to be made to the core halftoning operation.

Also, instead of performing a multi-level halftoning operation on a continuous-tone value of a color component that will be rendered in two inks, we map that value to two new continuous-tone values, one for each ink, and then separately halftone the new values in the normal binary fashion.

By thus mapping the images to be rendered, we avoid much of the design lead time that developing a new high-performance printer would otherwise require. The resulting architecture provides a modular, scaleable basis for printing with multiple inks and multiple printing resolutions (multiple dot-placement geometries) with minimal design effort.

BRIEF DESCRIPTION OF THE DRAWINGS

The invention description below refers to the accompanying drawings, of which:

FIG. 1 is a block diagram of computer system that can employ the present invention's teachings;

FIG. 2 is a block diagram that depicts the present invention's typical software environment;

FIG. 3 is a block diagram that depicts an example of the type of signal-processing sequence that can employ the present invention's teachings;

FIG. 4 is a block diagram of FIG. 3's color half-toning operation;

FIG. 5 is a plot of the relationships among nominal cyan value and light and dark cyan values in FIG. 4's mapping operations;

FIG. 6 is a more-detailed block diagram of the cyan component's halftoning;

FIGS. 7A–C are diagrams that illustrate the relationships among square, rectangular, and checkerboard pixel geometries;

FIG. 8A is a plot of the relationship between nominal dark cyan value and the even-pixel cyan value employed in one of FIG. 6's mapping operations;

FIG. 8B is a plot of the relationship between nominal dark cyan value and the odd-pixel photo-cyan value employed in another of FIG. 6's mapping operations;

FIG. 9 is a more-detailed block diagram of FIG. 6's common halftoning operation;

FIG. 10 is a diagram of an error-diffusion kernel of the type that an embodiment of the present invention might use;

FIG. 11 is a diagram of the application of FIG. 10's kernel to a square pixel geometry; and FIG. 12 is a diagram of the application of FIG. 10's kernel to a rectangular pixel geometry whose aspect ratio is two.

DETAILED DESCRIPTION OF AN ILLUSTRATIVE EMBODIMENT

FIG. 1 depicts a typical hardware environment. A personal computer 12 sends a display device such as an ink-jet printer 13 low-level instructions, i.e., instructions that specify which individual display-medium pixels should receive ink dots of various colors. Computers that are capable of employing the present invention's teachings come in a wide variety of configurations, and FIG. 1 depicts one in which the printer 13 receives these instructions by way of an appropriate channel 14 provided by an input-output adapter 16 with which a central processing unit 18 communicates through an internal bus 20.

Of course, the central processing unit 18 will typically fetch data and instructions at various times from a variety of sources, such as solid-state read-only and read-write memories 22 and 24. FIG. 1 also depicts the computer 12 as communicating, as is typical, with a keyboard 26 by way of an interface adapter 28.

The present invention particularly concerns display devices within this environment, and in this connection FIG. 1 depicts the central processing unit 18 as being coupled to a cathode-ray-tube display 30 by a display adapter 31. The computer 12 can employ the present invention's teachings not only to drive printer 13 but also to form an image on the cathode-ray-tube display 30; the broader aspects of the invention are applicable to any pixel-organized display device. But we will restrict our attention to its use for operating the printer.

In the typical situation, the computer 12 employs the present invention's teachings in the course of acting as a printer driver. The instructions that configure the computer to perform this function are usually included in the operating-system software stored on a disc 32 that the central processing unit 18 can read with the aid of the computer's disc drive 34. Often, the disc 32 will have been loaded from another disc drive that reads another type of disc, such as a diskette, a CD-ROM, or a DVD. In any event, the computer 12 reads the printer-driver instructions from the disc drive 32 in most cases and then performs the below-described functions to implement the present invention's teachings.

FIG. 2 depicts the typical operational environment from the software standpoint. The dither matrix generated in accordance with the present invention's teachings typically comes into play when the computer 12 is operating a user's application program 40 and that program makes a system call requesting that an image be printed. The requested operation is carried out by a printer driver 42, which is usually considered to be part of the operating system but is specific to the designated printer. The printer driver's purpose is to convert a device-independent representation of the image into low-level printer instructions that will cause the printer to render that image as faithfully as the printer's limitations permit.

There are many types of image-processing sequence that can profitably employ the present invention's teachings. The sequence that FIG. 3 depicts is typical. Let us assume a source image represented in RGB (red, green, and blue) format. Consistently with the previous discussion, we also assume that the original continuous-tone image consists of eight bits per pixel color component, i.e., a total of twenty-four bits per pixel, and is subjected to color-correction operations that blocks 44 and 46 represent. A multi-level dithering operation 44 quantizes the source values: each color-component in step 46's quantized output can assume one of only seventeen possible values, by which step 46 addresses a color-correction look-up table used to correct certain imperfections in the printing process. Alternatively, one can employ the coarse-quantization addresses closest to the fine-quantization input values and generate outputs from the thus-addressed contents by tetrahedral interpolation. In either case, thus limiting the possible look-up-table addresses enables one to keep the table size to 17×17×17 instead of the impractical 256×256×256 size that would have been required without the coarser quantization. Commonly assigned U.S. patent application Ser. No. 08/607,074, filed Feb. 26, 1996, by Shu et al. for Generating Color-Correction Look-Up-Table Addresses by Multi-Level Half-Toning, describes these operations further. We incorporate that application by reference.

In a typical arrangement, each look-up-table location may contain, for example, four 4-bit values, one each for the cyan, magenta, yellow, and black inks that the printer will use. The values may be chosen to correct for the non-ideal colors of the inks that various printers employ and for the non-linear effects of ink-dot shapes. They may also be used to limit ink use enough to prevent the ink from bleeding on paper of the intended type and convert the image from a positive-color, RGB representation typically used for computer monitors to the negative-color, CMYK (cyan, magenta, yellow and black) representation that color printers more commonly use.

The resultant output image can be thought of as consisting of four image components, each of which consists of a different one of the components of all the pixel values. Each such component may be subjected to image smoothing and/or edge enhancement in a filtering operation 48 before a halftoning operation 50 whose binary output for each pixel indicates whether that pixel will receive an ink drop.

FIG. 3's step 50 is a halftoning step because its input consists of fine-value-quantization, "continuous-tone" pixel values, whereas its output consists of coarse-value-quantization, "halftoned" pixel values. But within that step are further continuous-tone-processing steps, as FIG. 4 illustrates. That drawing shows the continuous-tone pixel values broken into their constituent components c, m, y, and k, each of which has an 8-bit representation. In step 50 the continuous-tone values y and k have been quantized into single-bit values Y and K, which respectively indicate whether the pixel they represent will receive yellow and black ink.

In contrast, the continuous-tone values c and m are quantized into respective two-bit values $\{C_D, C_P\}$ and $\{M_D, M_P\}$. Each bit in the two-bit cyan value is used to control a different cyan-colored ink: $C_D$ controls application of normal, dark-cyan ink, whereas $C_P$ controls application of lighter, photo-cyan ink. The two magenta bits similarly control light- and dark-magenta inks. So the four continuous-tone image components have been processed into six halftone image components. This is a typical use of a multiple-bit halftone output. But systems that employ certain of the present invention's aspects differ from conventional multiple-bit halftone approaches in that they generate separate continuous-tone values for the dark and light inks of the same color, and they halftone these two continuous-tone values separately. Block 52 represents mapping the continuous-tone cyan value c into continuous-tone dark-cyan and photo-cyan values $c_D$ and $c_P$, and block 54 represents mapping the continuous-tone magenta value m into continuous-tone dark-magenta and photo-magenta values $m_D$ and $m_P$. The illustrated printer driver halftones these values rather than the original c and m values, so it can use binary halftoning and thereby avoid the need to use a separate, multiple-level halftoning operation on cyan and magenta.

The mapping functions that the present invention's embodiments use will vary, depending on what mix of light and dark cyan inks is best for the particular printer and print medium employed, but the functions that FIG. 5 depicts for operation 52 are typical. The dashed plot represents the continuous-tone value for light cyan and illustrates that for low input cyan values the light-cyan value predominates and exceeds the input value. This is the purpose of employing light cyan: it requires a higher percentage of dots to yield a same color darkness, so light regions are printed less sparsely than they would be if only a single cyan ink were used. Higher dot densities typically reduce the perception of dot noise and pattern artifacts. To obtain darker shades, dark cyan is necessary and use of the light cyan will typically taper off to limit ink duty.

The relationships that operation 54 employs are similar. The illustrated embodiment is not intended for use with multiple yellow and black inks, but light and dark values for these components could be generated similarly.

The halftoning operations 56 are largely similar to the halftoning operation 58 applied to the dark cyan component. FIG. 6 illustrates halftoning operation 58, which employs another aspect of the present invention. Like the aspect of the invention just described, this one is applicable to a wide range of halftoning approaches. For reasons that will become apparent shortly, however, the following aspect is not as well suited to approaches that include a cluster-dot-dither component.

In an operation that FIG. 6 depicts conceptually as a demultiplexor 60, the halftoning operations 56 together divide the input image into two interleaved images, for a purpose that will now be explained by reference to FIGS. 7A–C. The circles in FIG. 7A represent locations at which the printer can deposit ink dots in one mode of operation. Corresponding circles in adjacent rows are aligned, and the row spacing equals the column spacing: the pixel locations exhibit a square geometry. We assume that various halftoning-operation parameters have been "tuned" for this geometry. Those parameters would conventionally have to be changed when the printer shifts to higher-dot-density operation, in which it employs a different pixel geometry, such as the rectangular geometry of FIG. 7B or the checkerboard geometry of FIG. 7C.

But (conceptual) demultiplexor 60 treats the image as two sub-images whose pixels are so interleaved with each other that the individual sub-image pixel geometries hare square. In FIG. 7B, for instance, pixels 64 would belong to one sub-image, while pixels 66 would belong to the other. Similarly, pixels 68 of FIG. 7C would belong to one sub-image, while pixels 70 would belong to the other. Since the sub-images' pixel geometries are square, required parameter changes are minimized.

Preserving color through this partitioning requires only simple one-dimensional mapping operations 72 and 74. A SELECT signal determines which of two mapping functions is to be employed on any given pixel's value. For the pixel geometry of FIG. 7B, this signal is the least-significant bit of the pixel's column index. For FIG. 7C's pixel geometry, it is the least-significant bit of the sum of the row and column indices. FIGS. 8A and 8B respectively depict operations 72 and 74's mapping relationships. Although these relationships are merely exemplary, they reveal why this aspect of the invention is less well suited to clustered-dot dithering: it tends to break up the resultant clusters. Other relationships can be used, but they should maintain the following relationship in a two-partition system:

$$C_{even} + C_{odd} = 2C_D.$$

FIG. 6 includes a multiplexor 76 to indicate that the same halftoning process 78 quantizes both thus-modified sub-images. But that common process is performed on the two sub-images separately, as FIG. 9 shows. Specifically, the error memory 80 or 82 with which process 78's halftoning operation 84 exchanges error information alternates from pixel to pixel, as a multiplexor/demultiplexor 86 indicates.

To understand this alternating operation, consider FIGS. 10 and 11, which illustrate a conventional error-diffusion process. FIG. 10 is a typical error-diffusion "kernel," which specifies how a halftoning operation's quantization error from one pixel is to "diffuse" to pixels yet to be processed. Suppose, for instance, that a threshold of 120 is used at FIG. 11's pixel 88 to halftone a color component such as FIG. 9's pixel-component value $c'_D$, while that component's adjusted input—i.e., $c'_D$ plus the error that has diffused to that pixel in the manner that will now be explained—equals 16. Since the adjusted input does not exceed the threshold, the halftone output is 0—the pixel receives no dark-cyan ink—so the output dark-cyan error is 16−0=16. This error is divided up among pixel 88's neighbors in accordance with the corresponding kernel coefficients: it is multiplied by ³⁄₁₆, ⁵⁄₁₆, ¹⁄₁₆, and ⁷⁄₁₆ to arrive at the amounts by which the accumulated errors for pixels 90, 92, 94, and 96, respectively, are incremented, and the accumulated errors for those pixels are then stored in memory until they are needed.

Now, suppose that this kernel has resulted from experimentation to optimize image quality in an image produced by a square pixel geometry but that the image is to be printed with the rectangular geometry of FIG. 7B. The FIG. 9 arrangement alternates error-memory use from one pixel to the next, so the errors diffuse to neighbors that are adjacent in the sub-image but not in complete image. That is, if FIG. 11 represents pixels in the even sub-image, the errors diffuse in the complete image as FIG. 12 illustrates: even though the complete image has an aspect ratio of two, the error diffusion occurs through sub-images that have the square geometry for which the kernel was tuned.

This approach eliminates a great deal of design effort. This can be further appreciated by recognizing that the error-diffusion kernel is not the only aspect of FIG. 9's process 84 that will have been optimized for a particular configuration. High-performance printers may employ a sophisticated mix of halftoning strategies. For instance, the halftoning equation may be:

$$O_{ij} = \begin{cases} 1 \text{ if } p_{ij} + \alpha(p_{ij})e_{ij} > \tau(p_{ij}) + \beta(p_{ij})d_{i \bmod M, j \bmod N} \\ 0 \text{ otherwise,} \end{cases}$$

where $O_{ij}$ is the halftone output, $p_{ij}$ is a continuous-tone input-pixel component value such as $c'_D$ for the jth pixel in sub-image row i, $e_{ij}$ is the accumulated error at that pixel, $\tau(p_{ij})$ can be thought of as the error-diffusion threshold, $d_{m,n}$, m=0, . . . M−1, n=0, . . . N−1, is a threshold in an M×N dispersed-dither matrix, and $\alpha$ and $\beta$ are functions that serve to emphasize the halftoning process's dispersed-dither nature for low component values and its error-diffusion nature for higher values. The error-diffusion-threshold function $T(p_{ij})$ is a monotonically increasing function of component value that is low for low component values so as to minimize the lag that afflicts error-diffusion operations. The function $\alpha$ is close to zero for low component values and close to unity for middle and high component values. The function $\beta$ is close to unity for low component values and equals a small number at high component values so as to contribute noise to the error-diffusion process that predominates at that range.

Now, it may not be necessary to employ so complex a halftoning function on every component. In particular, we prefer to limit yellow-component halftoning to a dither operation, avoiding the computation overhead that error diffusion imposes. But the functions used on the other components may have to be even more complex. For example, they may include noise and offset values that are functions of neighborhood-pixel values. And each one of these constituent functions may have to be optimized by experiment for a given pixel geometry. So their development for other pixel geometries imposes a heavy burden. The present invention enables the designer to avoid that burden, and it therefore constitutes a significant advance in the art.

What is claimed is:

1. For operating an image-presenting mechanism responsive to the application thereto of electrical command signals to display an image that the command signals represent, a method comprising the steps of:

A) performing a sequence of image-revision steps, in which sequence each image-revision step receives electrical input signals representing an input image consisting of input pixels that the input signals represent as respective input-pixel values, each of which consists of one pixel component value for each of at least one image component of which the input image consists and produces therefrom electrical output signals representing an output image consisting of output pixels that the output signals represent as respective output-pixel values, the input image of the first image-revision step is the source image, the input image of any subsequent image-revision step is the output image of the preceding image-revision step, and in which one said image-revision step is a half-toning step that comprises, for at least one image component:
  i) generating from the halftoning step's input image a plurality of mapped sub-images;
  ii) generating respective halftoned sub-images by separately halftoning the mapped sub-images; and
  iii) generating the halftoning step's output image by interleaving the halftoned sub-images; and
B) applying to the image-presenting mechanism electrical command signals that represent the output image produced by the last image-revision step.

2. A method as defined in claim 1 wherein the step of generating the halftoned sub-images comprises:
  A) dividing the halftoning step's input image into a plurality of interleaved sub-images, each of which consists of a plurality of respective pixels interleaved in the half-toning step's input image with the pixels of which each other sub-image consists; and
  B) generating the mapped sub-images by applying different respective sub-image mapping functions to the different sub-images' pixel values.

3. A method as defined in claim 1 wherein the number of sub-images generated in the step of generating a plurality of mapped sub-images is two.

4. A method as defined in claim 3 wherein the step of applying the electrical command signals to the image-presenting mechanism comprises so applying the command signals to the image-presenting mechanism as to cause it to apply an imaging agent to an image medium in accordance with one of the halftoned sub-images at a first set of pixel locations having a first square pixel geometry and to apply the imaging agent to the image medium in accordance with the other halftoned sub-image at pixel locations having a second square pixel geometry and so interleaved with the first set of pixel locations as to form a rectangular pixel geometry having an aspect ratio of two.

5. A method as defined in claim 3 wherein the step of applying the electrical command signals to the image-presenting mechanism comprises so applying the command signals to the image-presenting mechanism as to cause it to apply an imaging agent to an image medium in accordance with one of the halftoned sub-images at a first set of pixel locations having a first square pixel geometry and to apply the imaging agent to the image medium in accordance with the other halftoned sub-image at pixel locations having a second square pixel geometry and so interleaved with the first set of pixel locations as to form a checkerboard pixel geometry.

6. A method as defined in claim 1 wherein the step of separately halftoning the mapped sub-images comprises employing error-diffusion operations in which errors from pixels in each sub-image diffuse only to pixels the same sub-image.

7. For operating an image-presenting mechanism responsive to the application thereto of electrical command signals to display an image that the command signals represent, a apparatus comprising:
  A) image-revision circuitry, responsive to electrical source-image signals representing a source image, for performing on the source image a sequence of image-revision steps, in which sequence each image-revision step receives electrical input signals representing an input image consisting of input pixels that the input signals represent as respective input-pixel values, each of which consists of one pixel component value for each of at least one image component of which the input image consists and produces therefrom electrical output signals representing an output image consisting of output pixels that the output signals represent as respective output-pixel values, the input image of the first image-revision step is the source image, the input image of any subsequent image-revision step is the output image of the preceding image-revision step, and in which one said image-revision step is a half-toning step that comprises, for at least one image component:
    i) generating from the halftoning step's input image a plurality of mapped sub-images;
    ii) generating respective halftoned sub-images by separately halftoning the mapped sub-images; and
    iii) generating the halftoning step's output image by interleaving the halftoned sub-images; and
  B) output circuitry responsive to the image-revision circuitry for applying to the image-presenting mechanism electrical command signals that represent the output image produced by the last image-revision step.

8. An apparatus as defined in claim 7 wherein the step of generating the halftoned sub-images comprises:
  A) dividing the halftoning step's input image into a plurality of interleaved sub-images, each of which consists of a plurality of respective pixels interleaved in the half-toning step's input image with the pixels of which each other sub-image consists; and
  B) generating the mapped sub-images by applying different respective sub-image mapping functions to the different sub-images' pixel values.

9. An apparatus as defined in claim 7 wherein the number of sub-images generated in the step of generating a plurality of mapped sub-images is two.

10. An apparatus as defined in claim 9 wherein the output circuitry so applies the electrical command signals to the image-presenting mechanism as to cause it to apply an imaging agent to an image medium in accordance with one of the halftoned sub-images at a first set of pixel locations having a first square pixel geometry and to apply the imaging agent to the image medium in accordance with the other halftoned sub-image at pixel locations having a second square pixel geometry and so interleaved with the first set of pixel locations as to form a rectangular pixel geometry having an aspect ratio of two.

11. An apparatus as defined in claim 9 wherein the output circuitry so applies the electrical command signals to the image-presenting mechanism as to cause it to apply an imaging agent to an image medium in accordance with one of the halftoned sub-images at a first set of pixel locations having a first square pixel geometry and to apply the imaging agent to the image medium in accordance with the other halftoned sub-image at pixel locations having a second square pixel geometry and so interleaved with the first set of pixel locations as to form a checkerboard pixel geometry.

12. An apparatus as defined in claim 7 wherein the step of separately halftoning the mapped sub-images comprises employing error-diffusion operations in which errors from pixels in each sub-image diffuse only to pixels the same sub-image.

13. A storage medium containing instructions readable by a computer to configure the computer to function as an apparatus for operating an image-presenting mechanism responsive to the application thereto of electrical command signals to display an image that the command signals represent, which apparatus comprises:

A) image-revision circuitry, responsive to electrical source-image signals representing a source image, for performing on the source image a sequence of image-revision steps, in which sequence each image-revision step receives electrical input signals representing an input image consisting of input pixels that the input signals represent as respective input-pixel values, each of which consists of one pixel component value for each of at least one image component of which the input image consists and produces therefrom electrical output signals representing an output image consisting of output pixels that the output signals represent as respective output-pixel values, the input image of the first image-revision step is the source image, the input image of any subsequent image-revision step is the output image of the preceding image-revision step, and in which one said image-revision step is a half-toning step that comprises, for at least one image component:
  i) generating from the halftoning step's input image a plurality of mapped sub-images;
  ii) generating respective halftoned sub-images by separately halftoning the mapped sub-images; and
  iii) generating the halftoning step's output image by interleaving the halftoned sub-images; and B) output circuitry responsive to the image-revision circuitry for applying to the image-presenting mechanism electrical command signals that represent the output image produced by the last image-revision step.

14. A storage medium as defined in claim 13 wherein the step of generating the half-toned sub-images comprises:

A) dividing the halftoning step's input image into a plurality of interleaved sub-images, each of which consists of a plurality of respective pixels interleaved in the half-toning step's input image with the pixels of which each other sub-image consists; and B) generating the mapped sub-images by applying different respective sub-image mapping functions to the different sub-images' pixel values.

15. A storage medium as defined in claim 13 wherein the number of sub-images generated in the step of generating a plurality of mapped sub-images is two.

16. A storage medium as defined in claim 15 wherein the output circuitry so applies the electrical command signals to the image-presenting mechanism as to cause it to apply an imaging agent to an image medium in accordance with one of the halftoned sub-images at a first set of pixel locations having a first square pixel geometry and to apply the imaging agent to the image medium in accordance with the other halftoned sub-image at pixel locations having a second square pixel geometry and so interleaved with the first set of pixel locations as to form a rectangular pixel geometry having an aspect ratio of two.

17. A storage medium as defined in claim 15 wherein the output circuitry so applies the electrical command signals to the image-presenting mechanism as to cause it to apply an imaging agent to an image medium in accordance with one of the halftoned sub-images at a first set of pixel locations having a first square pixel geometry and to apply the imaging agent to the image medium in accordance with the other halftoned sub-image at pixel locations having a second square pixel geometry and so interleaved with the first set of pixel locations as to form a checkerboard pixel geometry.

18. A storage medium as defined in claim 13 wherein the step of separately halftoning the mapped sub-images comprises employing error-diffusion operations in which errors from pixels in each sub-image diffuse only to pixels the same sub-image.

19. For operating an image-presenting mechanism responsive to the application thereto of electrical command signals to display an image that the command signals represent, a method comprising the steps of:

A) performing a sequence of image-revision steps, in which sequence each image-revision step receives electrical input signals representing an input image consisting of input pixels that the input signals represent as respective input-pixel values, each of which consists of one pixel component value for each of a plurality of image components of which the input image consists and produces therefrom electrical output signals representing an output image consisting of output pixels that the output signals represent as respective-pixel component values, the input image of the first image-revision step is the source image, the input image of any subsequent image-revision step is the output image of the preceding image-revision step, and in which one said image-revision step is a half-toning step that comprises:
  i) generating separate light- and dark-color continuous-tone image components from an image component of the halftoning step's input image;
  ii) generating light- and dark-color halftone image components by separately halftoning the light- and dark-color continuous-tone image components; and
  iii) including the light- and dark-color halftone image components in the halftoning step's output image; and B) applying to the image-presenting mechanism electrical command signals that cause it to apply to an image medium separate light and dark imaging agents of the same color in accordance with the light- and dark-color halftone image components, respectively.

20. A method as defined in claim 19 wherein the step of separately halftoning the light- and dark-color continuous-tone image components comprises:

A) dividing each said light- and dark-color continuous-tone image component into a plurality of interleaved sub-images, each of which consists of a plurality of respective pixels interleaved in that image component with the pixels of which the other sub-images consist;

B) generating respective mapped sub-images by applying respective sub-image mapping functions to the different sub-images' pixel values;

C) generating respective halftoned sub-images by halftoning the sub-images separately; and D) generating light- and dark-color halftone image components by interleaving the halftoned sub-images.

21. A method as defined in claim 19 wherein the step of applying command signals to the image-presenting mechanism comprises so applying the electrical command signals as to cause it to apply to an image medium separate light and dark cyan imaging agents in accordance with the light- and dark-color halftone image components, respectively.

22. A method as defined in claim 19 wherein the step of applying command signals to the image-presenting mechanism comprises so applying the electrical command signals as to cause it to apply to an image medium separate light and dark magenta imaging agents in accordance with the light- and dark-color halftone image components, respectively.

23. A method as defined in claim 19 wherein the step of separately halftoning the light- and dark-color continuous-tone image components comprises employing error diffusion.

24. For operating an image-presenting mechanism responsive to the application thereto of electrical command signals to display an image that the command signals represent, an apparatus comprising:

A) image-revision circuitry, responsive to electrical source-image signals representing a source image, for performing on the source image a sequence of image-revision steps, in which sequence each image-revision step receives electrical input signals representing an input image consisting of input pixels that the input signals represent as respective input-pixel values, each of which consists of one pixel component value for each of a plurality of image components of which the input image consists and produces therefrom electrical output signals representing an output image consisting of output pixels that the output signals represent as respective-pixel component values, the input image of the first image-revision step is the source image, the input image of any subsequent image-revision step is the output image of the preceding image-revision step, and in which one said image-revision step is a halftoning step that comprises:

i) generating separate light- and dark-color continuous-tone image components from an image component of the halftoning step's input image;

ii) generating light- and dark-color halftone image components by separately halftoning the light- and dark-color continuous-tone image components; and iii) including the light- and dark-color halftone image components in the halftoning step's output image; and B) output circuitry responsive to the image-revision circuitry for applying to the image-presenting mechanism electrical command signals that cause it to apply to an image medium separate light and dark imaging agents of the same color in accordance with the light- and dark-color halftone image components, respectively.

25. An apparatus as defined in claim 24 wherein the step of separately halftoning the light- and dark-color continuous-tone image components comprises:

A) dividing each said light- and dark-color continuous-tone image component into a plurality of interleaved sub-images, each of which consists of a plurality of respective pixels interleaved in that image component with the pixels of which the other sub-images consist;

B) generating respective mapped sub-images by applying respective sub-image mapping functions to the different sub-images' pixel values;

C) generating respective halftoned sub-images by halftoning the sub-images separately; and D) generating light- and dark-color halftone image components by interleaving the halftoned sub-images.

26. An apparatus as defined in claim 24 wherein the output circuitry so applies the electrical command signals to the image-presenting mechanism as to cause it to apply to an image medium separate light and dark cyan imaging agents in accordance with the light- and dark-color halftone image components, respectively.

27. An apparatus as defined in claim 24 wherein the output circuitry so applies the electrical command signals to the image-presenting mechanism as to cause it to apply to an image medium separate light and dark magenta imaging agents in accordance with the light- and dark-color halftone image components, respectively.

28. An apparatus as defined in claim 24 wherein the step of separately halftoning the light- and dark-color continuous-tone image components comprises employing error diffusion.

29. A storage medium containing instructions readable by a computer to configure the computer to function as an apparatus for operating an image-presenting mechanism responsive to the application thereto of electrical command signals to display an image that the command signals represent, which apparatus comprises:

A) image-revision circuitry, responsive to electrical source-image signals representing a source image, for performing on the source image a sequence of image-revision steps, in which sequence each image-revision step receives electrical input signals representing an input image consisting of input pixels that the input signals represent as respective input-pixel values, each of which consists of one pixel component value for each of a plurality of image components of which the input image consists and produces therefrom electrical output signals representing an output image consisting of output pixels that the output signals represent as respective-pixel component values, the input image of the first image-revision step is the source image, the input image of any subsequent image-revision step is the output image of the preceding image-revision step, and in which one said image-revision step is a halftoning step that comprises:

i) generating separate light- and dark-color continuous-tone image components from an image component of the halftoning step's input image;

ii) generating light- and dark-color halftone image components by separately halftoning the light- and dark-color continuous-tone image components; and iii) including the light- and dark-color halftone image components in the halftoning step's output image; and B) output circuitry responsive to the image-revision circuitry for applying to the image-presenting mechanism electrical command signals that cause it to apply to an image medium separate light and dark imaging agents of the same color in accordance with the light- and dark-color halftone image components, respectively.

30. A storage medium as defined in claim 29 wherein the step of separately halftoning the light- and dark-color continuous-tone image components comprises:

A) dividing each said light- and dark-color continuous-tone image component into a plurality of interleaved sub-images, each of which consists of a plurality of respective pixels interleaved in that image component with the pixels of which the other sub-images consist;

B) generating respective mapped sub-images by applying respective sub-image mapping functions to the different sub-images' pixel values;

C) generating respective halftoned sub-images by halftoning the sub-images separately; and D) generating light- and dark-color halftone image components by interleaving the halftoned sub-images.

31. A storage medium as defined in claim 29 wherein the output circuitry so applies the electrical command signals to the image-presenting mechanism as to cause it to apply to an image medium separate light and dark cyan imaging agents in accordance with the light- and dark-color halftone image components, respectively.

32. A storage medium as defined in claim 29 wherein the output circuitry so applies the electrical command signals to the image-presenting mechanism as to cause it to apply to an image medium separate light and dark magenta imaging agents in accordance with the light- and dark-color halftone image components, respectively.

33. A storage medium as defined in claim 29 wherein the step of separately halftoning the light- and dark-color continuous-tone image components comprises employing error diffusion.

34. An image-presentation system comprising:

A) image-revision circuitry, responsive to electrical source-image signals representing a source image, for performing on the source image a sequence of image-revision steps, in which sequence each image-revision step receives electrical input signals representing an input image consisting of input pixels that the input signals represent as respective input-pixel values, each of which consists of one pixel component value for each of a plurality of image components of which the input image consists and produces therefrom electrical output signals representing an output image consisting of output pixels that the output signals represent as respective-pixel component values, the input image of the first image-revision step is the source image, the input image of any subsequent image-revision step is the output image of the preceding image-revision step, and in which one said image-revision step is a halftoning step that comprises:
  i) generating separate light- and dark-color continuous-tone image components from an image component of the halftoning step's input image;
  ii) generating light- and dark-color halftone image components by separately halftoning the light- and dark-color continuous-tone image components; and
  iii) including the light- and dark-color halftone image components in the halftoning step's output image; and B) an image-presenting mechanism responsive to the application thereto of electrical command signals to present an image that the command signals represent; and C) output circuitry responsive to the image-revision circuitry for applying to the image-presenting mechanism electrical command signals that cause it to apply to an image medium separate light and dark imaging agents of the same color in accordance with the light- and dark-color halftone image components, respectively.

* * * * *